(12) United States Patent
Temme (10) Patent No.: US 11,899,423 B2
(45) Date of Patent: Feb. 13, 2024

(54) REDUNDANT VALVE POSITION DETECTION SYSTEM

(71) Applicant: Honeywell International Inc., Morris Plains, NJ (US)

(72) Inventor: Guido Temme, Bad Iburg (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 319 days.

(21) Appl. No.: 16/949,468

(22) Filed: Oct. 30, 2020

(65) Prior Publication Data

US 2022/0137588 A1 May 5, 2022

(51) Int. Cl.
| G05B 19/406 | (2006.01) |
| F16K 37/00 | (2006.01) |
| F16K 31/02 | (2006.01) |

(52) U.S. Cl.
CPC ............ *G05B 19/406* (2013.01); *F16K 31/02* (2013.01); *F16K 37/0041* (2013.01); *G05B 2219/41305* (2013.01)

(58) Field of Classification Search
CPC .............................. F16K 31/02; F16K 37/0041
See application file for complete search history.

(56) References Cited

U.S. PATENT DOCUMENTS

| 5,433,245 A | 7/1995 | Prather et al. |
| 6,064,192 A | 5/2000 | Redmyer |
| 7,640,093 B2 | 12/2009 | Watanabe et al. |
| 7,917,314 B2 | 3/2011 | Gilbert et al. |
| 8,403,037 B2 | 3/2013 | Agrawal et al. |
| 9,316,147 B2 | 4/2016 | Wang et al. |
| 10,067,168 B2 | 9/2018 | Suchoff |
| 10,502,323 B2 | 12/2019 | Waehrisch et al. |
| 10,533,682 B2 | 1/2020 | Eisenbeis et al. |
| 2011/0267032 A1 | 11/2011 | Zhang et al. |
| 2016/0369898 A1 | 12/2016 | Waehrisch et al. |
| 2017/0090004 A1 | 3/2017 | Marshall et al. |
| 2018/0136258 A1 | 5/2018 | Cook et al. |
| 2019/0226601 A1 | 7/2019 | Feng et al. |

FOREIGN PATENT DOCUMENTS

| CN | 206096429 U | 4/2017 |
| EP | 2467630 | 6/2012 |
| JP | 2017-194142 | 10/2017 |
| WO | 2018000033 A1 | 1/2018 |

OTHER PUBLICATIONS

"Acuvim II Series Power Meter: User's Manual," AccuEnergy, 2(3): 2015 (350 pages total).
Csanyi, "Basic three-phase power measurements explained," IAEI News Magazine, May 16, 2017 (9 pages total).
"3-Phase-Power Meter" PCE Instruments, pp. 216-218, downloaded Feb. 20, 2019 from www.pce-instruments.com/us (3 pages total).

(Continued)

*Primary Examiner* — Eric Keasel
(74) *Attorney, Agent, or Firm* — John Maldjian, Esq.; Stevens & Lee PC (57) ABSTRACT

One implementation is a device for determining the position of a valve. The device uses a current profile including at least the magnitude of current, and an analysis module for using the current profile and the state of the valve to perform at least one action.

19 Claims, 6 Drawing Sheets

(56) References Cited

OTHER PUBLICATIONS

"Power Indicator PCE-ND30: User's Manual" PCE Instruments, downloaded Feb. 20, 2019, from https://www.pce-instruments.com/english/api/getartfile?_fnr=1235501&_dsp=inline (64 pages total).
"Meter of Network Parameters ND10 Type: User's Manual" PCE Instruments, downloaded Feb. 20, 2019, from https://asset.conrad.com/media10/add/160267/c1/-/en/001384094ML02/manual-1384094-programovatelny-3fazovy-multimetr-lumel-nd10-22000e0.pdf (51 pages total).
"Extremely powerful 3-phase energy meter" Quibino, downloaded Feb. 20, 2019 from https://qubino.com/products/3-phase-smart-meter/ (18 pages total).
"Near-field communication" Wikipedia, last edited Feb. 11, 2019. (15 pages total).
BK-G4 Meter, Honeywell, Retrieved on Sep. 24, 2020 from https://www.smartenergy.honeywell.com/product/bk-g4-meter/?utm_source=cj&utm_medium=affiliate&utm_campaign=Bing+Rebates+by+Microsoft&clickId=14494849&cjevent=bc4713148b6911ec812f017d0a82b820&cjdata=MXxOfDB8WXww (2 pages total).
BK-G4 an BK-G4T, Elster Vital Connections, 2012 (2 pages total).
European Search Report issued in connection with corresponding European Patent Application No. 21180479.4 dated Nov. 19, 2021 (8 pages total).

REDUNDANT VALVE POSITION DETECTION SYSTEM

CROSS-REFERENCE TO RELATED APPLICATIONS

This application incorporates by reference in its entirety, application Ser. No. 16/909,802 entitled "SWITCHLESS VALVE POSITION DETECTION SYSTEM" filed Jun. 23, 2020 ("Switchless Valve Control Patent").

BACKGROUND

Some valves are present in "fail-safe" systems. A fail-safe is a design feature or practice that in the event of a specific type of failure, it inherently responds in a way that will cause minimal or no harm to other equipment, to the environment or to people. Unlike inherent safety to a particular hazard, a system being fail-safe does not mean failure is impossible or improbable, but rather the system's design prevents or mitigates unsafe consequences of the system's failure.

Valves and systems that control valves are sometimes required to be fail-safe systems. Redundant information sensing is one way to make a system of valves fail-safe. If information is sensed more than once, it increases the chances an erroneous reading of one sensor will not always be determinative of how the valve behaves.

SUMMARY

One implementation is a device that comprises a driver having a mechanical connection to the valve and configured to change a position of the valve, a controller electrically connected to the driver and configured to electrically cause the driver to change the position of the valve, a current sensor electrically connected to the driver configured to detect a magnitude of current associated with the driver, a position switch associated with the valve configured to detect a state of the valve, a current profile including at least the magnitude of current, and an analysis module for using the current profile and the state of the valve to perform at least one action.

Another implementation is for one or more hardware-based non-transitory memory devices storing computer-readable instructions which, when executed by the one or more processors disposed in a computing device, cause the computing device to change a position of a valve using a driver having a mechanical connection to the valve, detect a magnitude of a current associated with the driver using a current sensor electrically connected to the driver, detect a state of the valve using a position switch associated with the valve, and perform at least one action with an analysis module that uses at least the magnitude of the current and the state of the valve.

Another implementation is a method for determining a position of a valve. The method comprises changing a position of a valve using a driver having a mechanical connection to the valve, detecting a magnitude of a current associated with the driver using a current sensor electrically connected to the driver, detecting a state of the valve using a position switch associated with the valve, and performing at least one action with an analysis module that uses at least the magnitude of the current and the state of the valve.

DETAILED DESCRIPTION OF THE INVENTION

The present system and approach may incorporate one or more processors, computers, controllers, user interfaces, wireless and/or wire connections, and/or the like, in an implementation described and/or shown herein. This description may provide one or more illustrative and specific examples or ways of implementing the present system and approach. There may be numerous other examples or ways of implementing the system and approach.

Figure 1:
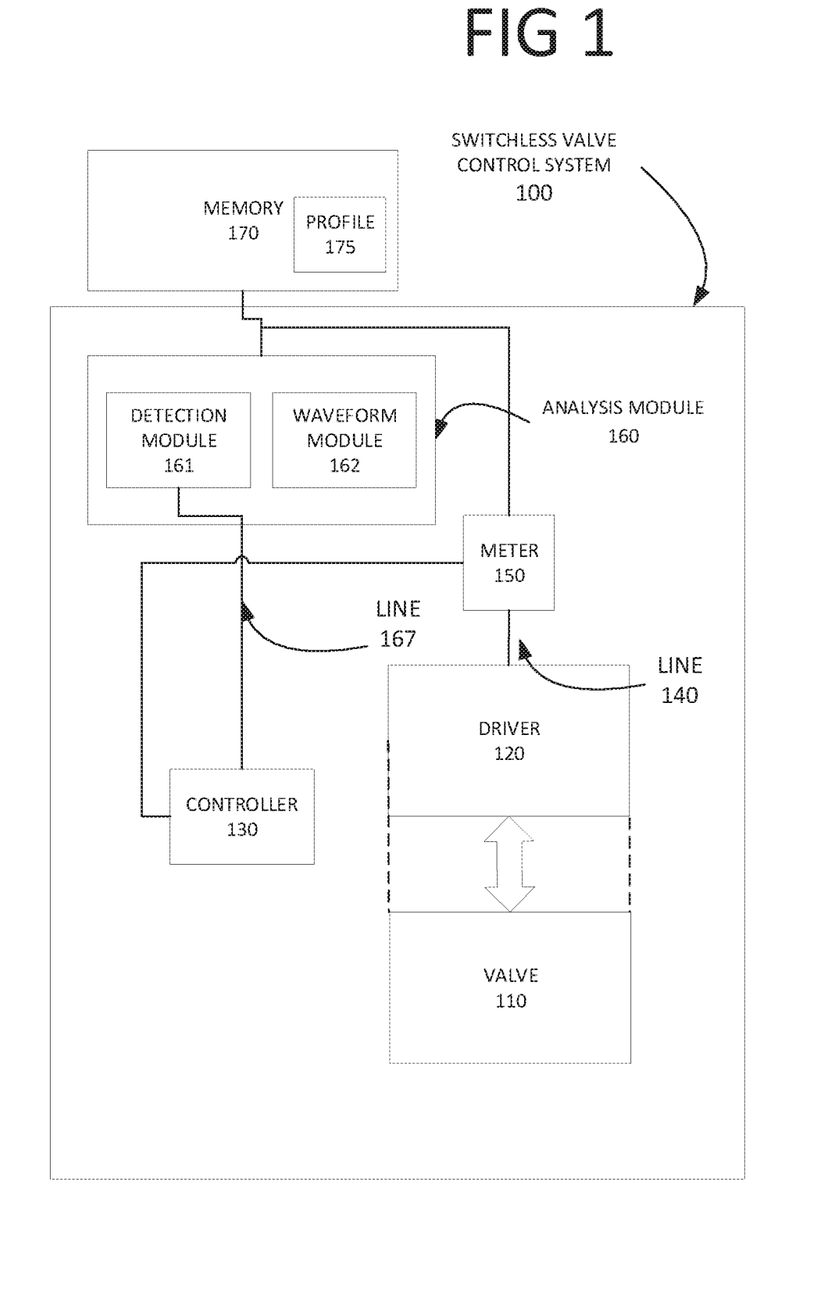
FIG. 1 is a basic diagram of a switchless valve control system.

FIG. 1 is a basic diagram of a switchless valve control system 100. The switchless valve control system 100 includes a valve 110 that is opened, closed, or moved to an intermediate position, by an electric valve moving driver 120. A controller 130 may provide power via at least line 140 to the driver 120. An ampere meter 150 may be connected in series with the line 140 or is part of the controller 130. Meter 150 may have an output to an analysis module 160 which can obtain a waveform associated with a magnitude of current provided to the driver 120. The analysis module 160 can be also part of the controller 130. A detection module 161 can use a waveform from a waveform module 162. In this manner, analysis module 160 can determine whether the valve 110 is opening, is open, closing, is closed, or is at an intermediate position.

Determinations of valve activity may be sent by the detection module 161 via a connection 167 to controller 130 so as to provide appropriate control of valve 110 with current control via line 140 (which may be one or more lines) to driver 102. Connections 167 and 140 may be wired or wireless. Controller 130 may incorporate a user interface. In other words, the switchless valve control system 100 may detect valve positions, opened and closed, as well as any arbitrary intermediate position, without switches by current measurement of, for example, a valve motor, and by driving the valve 110 to a defined block position.

A software algorithm, which is parameterized to new valve performance of current and time, may have a learning algorithm in that these valve parameters can be adapted to later ageing and dust effects in the analysis module 160. This adaption may be done smoothly to avoid the learning of failure modes. The system 100 may remain robust for voltage and temperature differences and can detect abnormal tamper or blocking conditions. The current measurement may be done by existing components with the micro of the electronic index and so achieving a significant cost reduction by removing the switches from the printed circuit board assembly (PCBA) appears feasible.

Within the scope of the cost reduction, one may minimize the material costs of the switchless valve control system 100. The challenge minimizing the current valve version development is to recognize the valve position as well as the further possible states by the physical signals like time, current, voltage with the goal to remove the end position switches. As minimum requirement is to recognize the end positions, (i.e., open and closed), as well as intermediate positions when needed. A straight-forward solution may be to detect the end position on a steep threshold of a current waveform. But this kind of detection alone may not be enough, because with respect to all known additional situations like ageing, tampering, environmental conditions, and so on, one needs to adapt a decision with maximum objectivity in comparison to a proper solution with the end position detectors realized by the hardware (HW), that provides geometrical position knowledge independent of the environmental conditions, tampering, and so on.

Data generated or captured in the waveform module 162 and/or the detection module 161 may include current values derived from opening or closing a valve by a microelectronic assembly. Information about the valves can be saved into a memory 170 by the analysis module 160. The analysis module 160 can also store a profile 175 in the memory 170. The profile 175 can be associated with the valve 110 and a portion of the data fields in the profile 175 are associated with captured or generated data associated with the valve 110. Various implementations may exist for a switchless valve control system such as the one described with respect to the switchless valve control system 100. The present implementation relies on one described with respect to the Switchless Valve Control Patent, so details have been omitted for the sake of brevity.

Figure 2:
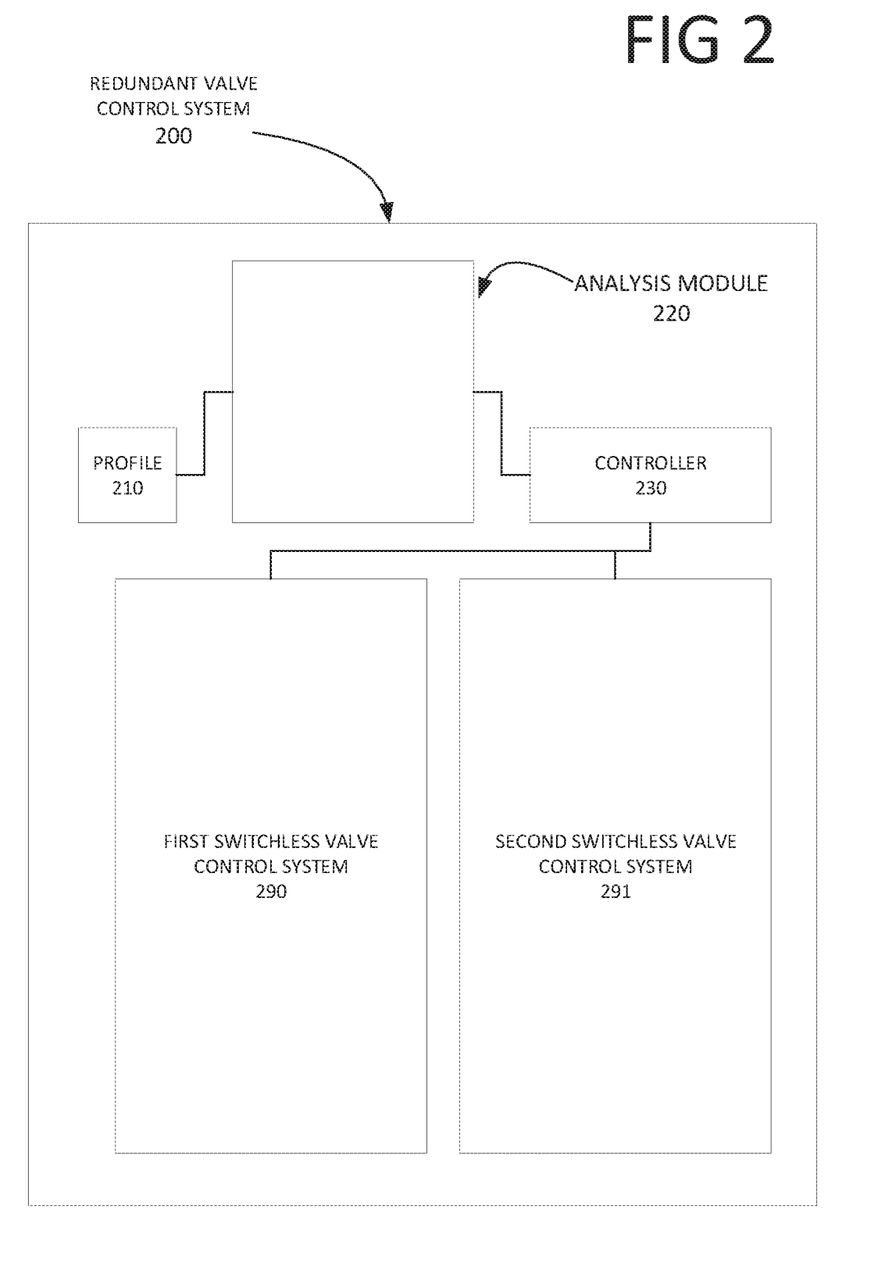
FIG. 2 is a basic diagram of a redundant valve control system that uses redundant switchless valve control systems.

FIG. 2 is a basic diagram of a redundant valve control system. The redundant valve control system 200 includes at least a first switchless valve control system 290 and a second switchless valve control system 291. The switchless valve control systems 290 and 291 can be as described with respect to FIG. 1, in one example. Likewise, the switchless valve control systems 290 and 291 can also rely, in one implementation, on the switchless valve control system described in the Switchless Valve Control Patent, which is herein incorporated by reference. An ampere meter or meters (not shown) can be resident in each of the first and the second switchless valve control systems 290 and 291. The meters can have an output to an analysis module 220 which can obtain a waveform associated with a magnitude of current provided to the driver in each of the first and the second switchless valve control systems 290 and 291. The analysis module 220 can be also part of the controller 230.

Data generated or captured in the analysis module 220 may include current values derived from opening or closing a valve by a microelectronic assembly in either of the first and the second valve control systems 290 and 291. Information about the valves can be saved into a memory by the analysis module 220. The analysis module 220 can also store a profile 210 in the memory. The profile 210 can be associated with the any of the valves in the first or the second switchless valve control systems 290 and 291.

Figure 3:
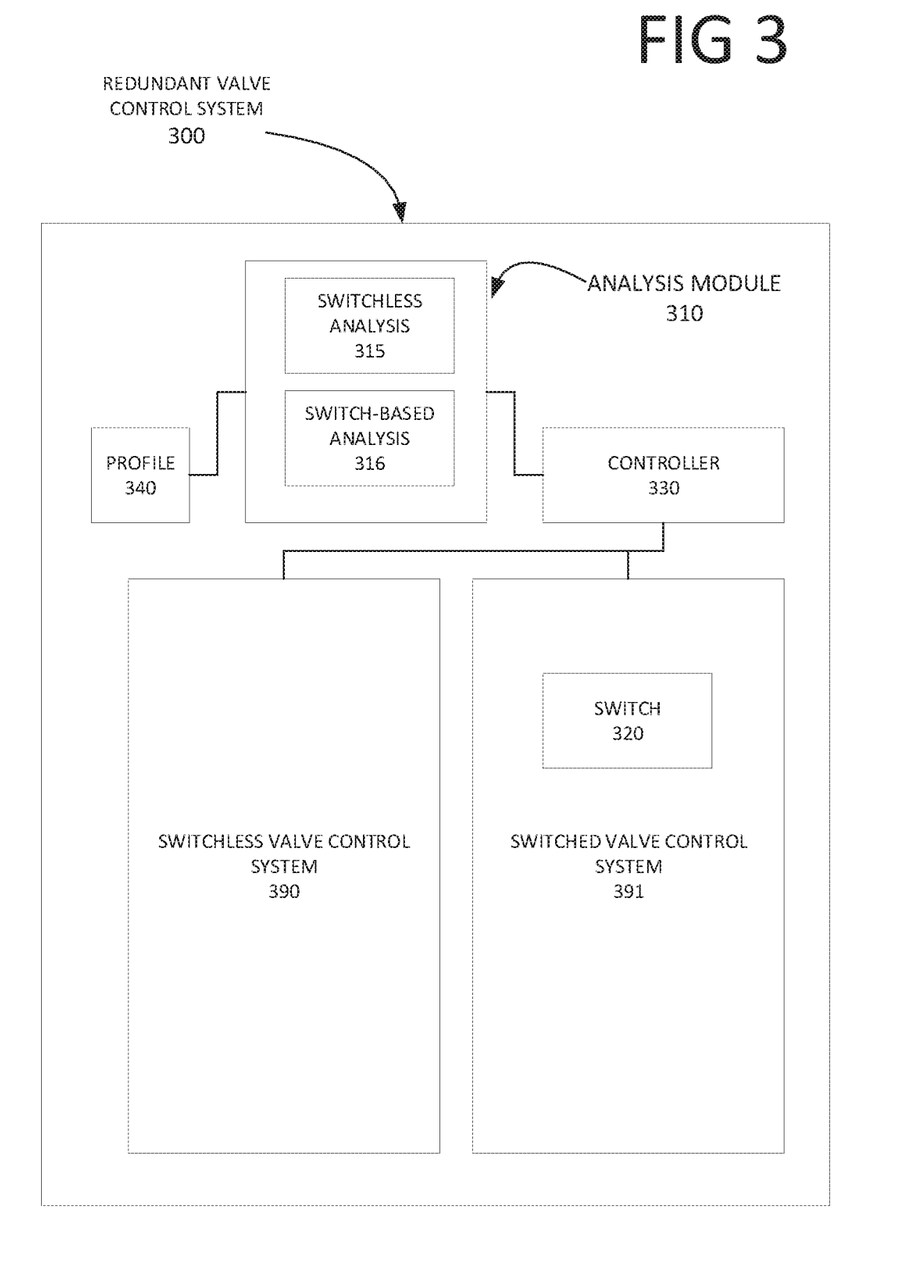
FIG. 3 is a basic diagram of the redundant valve control system that uses redundant valve control systems, a first being switchless and a second being switched.

FIG. 3 is a basic diagram of a redundant valve control system. The redundant valve control system 300 includes at least a switchless valve control system 390 and a switched valve control system 391. The valve control system 390 can be as described with respect to FIG. 1 in one example. In another example, the valve control system 390 can be the switchless valve control system described in the Switchless Valve Control Patent. An ampere meter or meters (not shown) can be resident in the switchless valve control system 390. The meters can have an output to an analysis module 310 which can obtain a waveform associated with a magnitude of current provided to the driver in the switchless valve control systems 390 in switchless analysis module 315.

A switch-based analysis module 316 receives data associated with the switch 320, including for example, whether the switch is open, closed, or at some intermediate state. In one example, the analysis module 310 is part of the controller 330. Data generated or captured in the analysis module 310, and it's associated sub-components the switch-based analysis module 316 or the switchless analysis module 315 may include current values derived from opening or closing a valve by a microelectronic assembly in either of the valve control systems 390 and 391. Information about the valves can be saved into a memory by the analysis module 310. The analysis module 310 can also store a profile 340 in the memory. The profile 340 can be associated with the any of the valves in the first or the second valve control systems 390 and 391.

Figure 4:
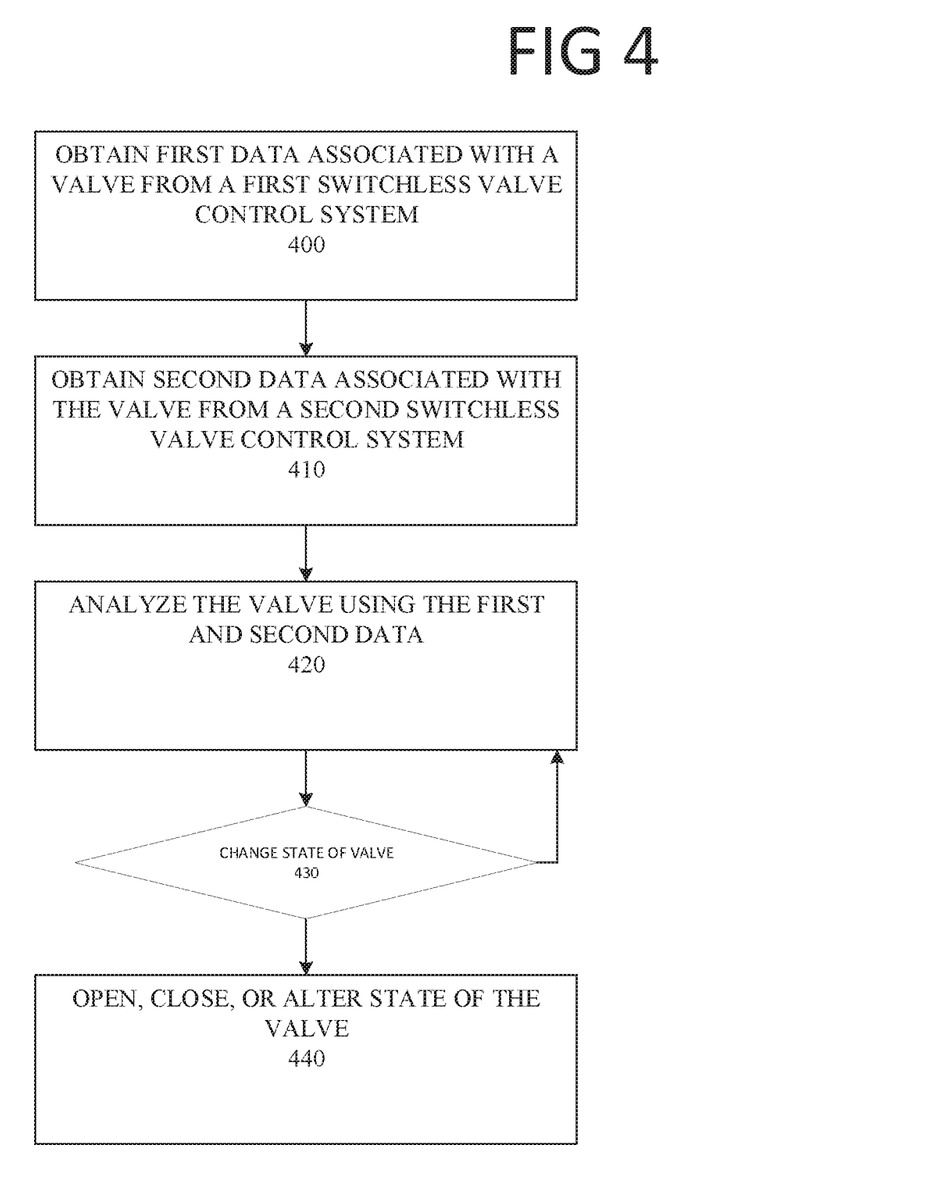
FIG. 4 is a flowchart that illustrates the present use of the redundant valve control system.

FIG. 4 is a flowchart that illustrates the present use of the redundant valve control system. At step 400, the system obtains first data associated with a first switchless valve control system. The switchless valve control system is described, for example, in the Switchless Valve Control Patent, herein incorporated by reference. At step 410, a second, redundant switchless valve control system is used. The system obtains second data associated with the second, redundant switchless valve control system. At step 420, a valve is analyzed using at least the first and the second data. This can be, for example, in an analysis module that can use the magnitude of current applied to the valve and perform, control, or prevent actions to the valve based on the analysis.

At step 430, the system determines whether the state of the valve needs to be changed. This could be, for example, based on the analysis module making a determination based on data from the first and the second redundant, switchless valve control systems. If no change is needed to the state of the valve, then the process repeats at step 430. When an action needs to be performed with respect to the valve (e.g., opening, closing or maintaining a state), the system performs the action at step 440. This could include, for example, opening the valve, closing the valve, changing an intermediate state of the valve, maintaining the current state of the valve, and the like.

Figure 5:
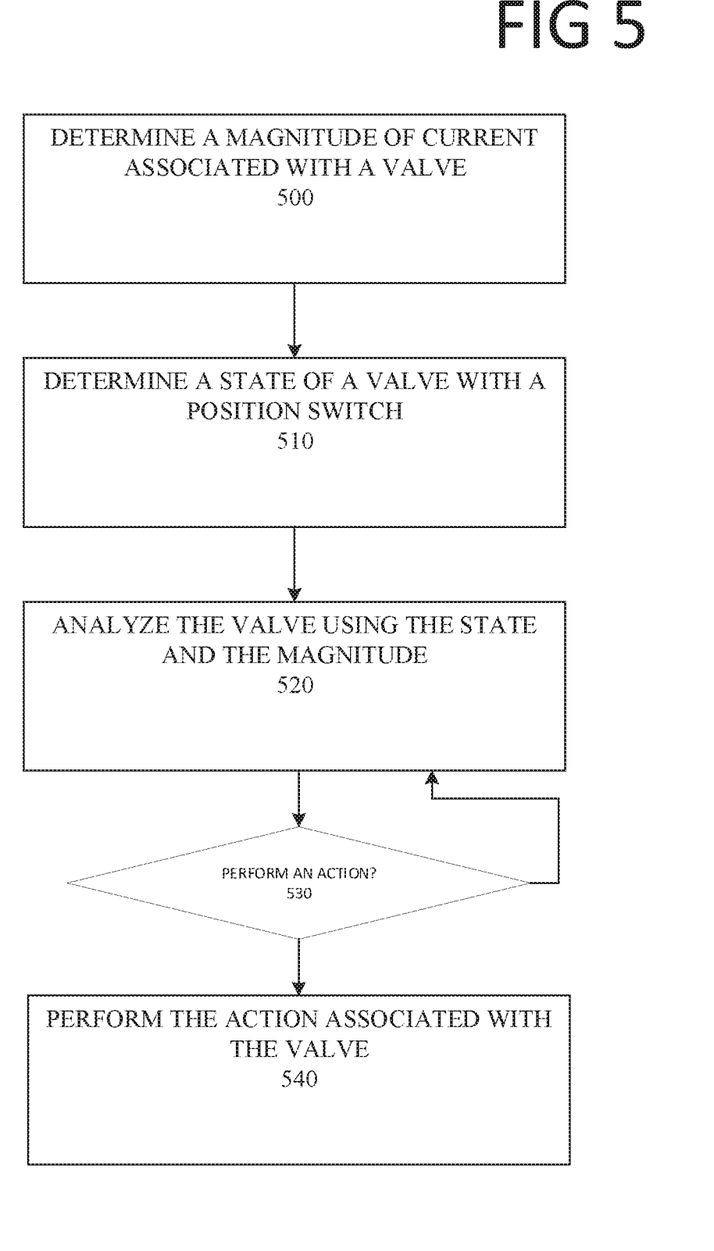
FIG. 5 is a flowchart that illustrates the present use of the redundant valve control system.

FIG. 5 is a flowchart that illustrates the present use of the redundant valve control system. At step 500, the system obtains first data associated with a first switchless valve control system. The first data includes, for example, a magnitude of current associated with the valve. The switchless valve control system is described, for example, in the Switchless Valve Control Patent, herein incorporated by reference. At step 510, a second, redundant switched valve control system is used. The system obtains second data associated with the second, redundant switched valve control system. The second data can be, for example, a state of a valve as indicated by a position switch. At step 520, a valve is analyzed using at least the first and the second data. This can be, for example, in an analysis module that can use the magnitude of current applied to the valve as well as the state of a position switch associated with the valve. In one example, this enables the system to perform, control, or prevent actions to the valve based on the analysis.

At step 530, the system determines whether the state of the valve needs to be changed. This could be, for example, based on the analysis module making a determination based on data from the first and the second redundant, valve control systems. If no change is needed to the state of the valve, then the process repeats at step 530. When an action needs to be performed with respect to the valve (e.g., opening, closing or maintaining a state), the system performs the action at step 540. This could include, for example, opening the valve, closing the valve, changing an intermediate state of the valve, maintaining the current state of the valve, and the like.

Figure 6:
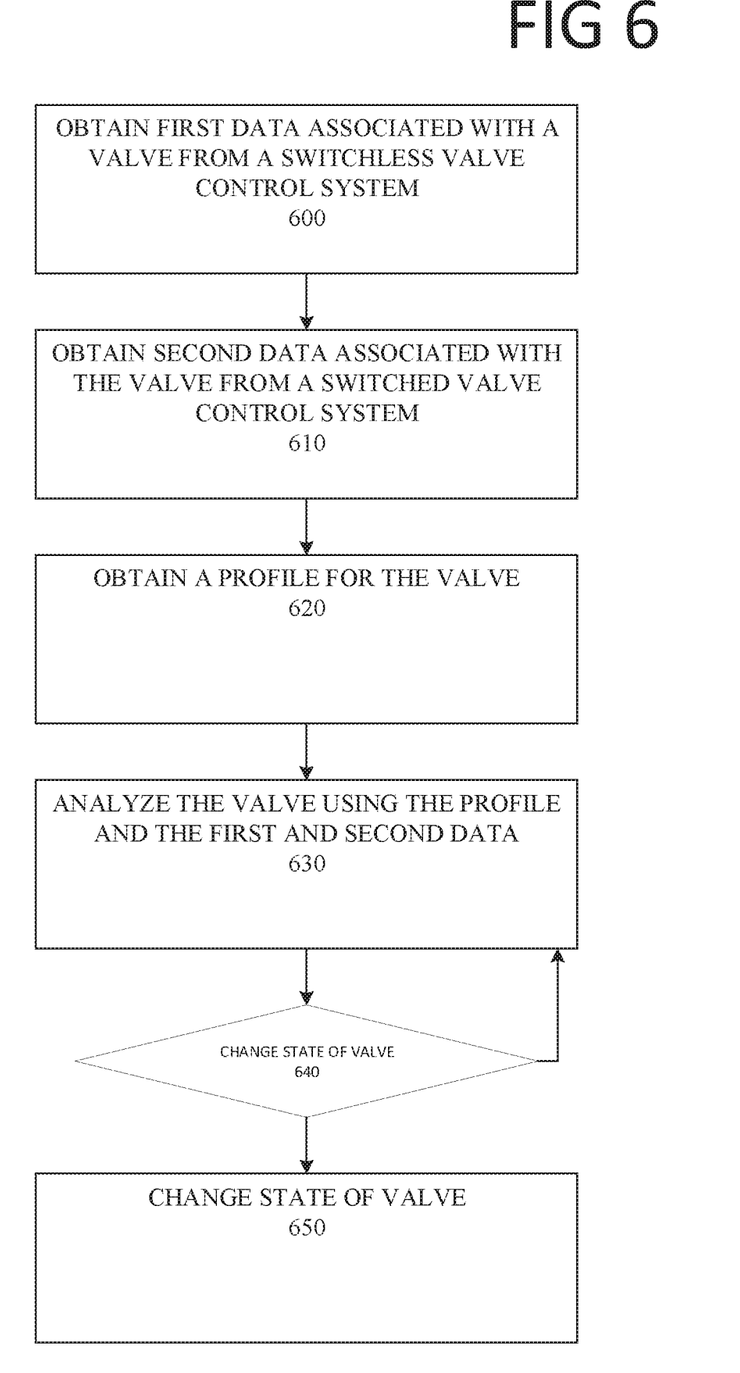
FIG. 6 is a flowchart that illustrates the present use of the redundant valve control system.

FIG. 6 is a flowchart that illustrates the present use of the redundant valve control system. At step 600, the system obtains first data associated with a first switchless valve control system. The first data includes, for example, a magnitude of current associated with the valve. The switchless valve control system is described, for example, in the Switchless Valve Control Patent, herein incorporated by reference. At step 610, a second, redundant switched valve control system is used. The system obtains second data associated with the second, redundant switched valve control system. The second data can be, for example, a state of a valve as indicated by a position switch. At step 620, a profile for the valve is obtained. The profile can be stored, in one example, in a memory are which the valve control system has access to.

At step 630, the valve is analyzed using at least the first and the second data, as well as the profile. This can be, for example, in an analysis module that has access to the memory where the profile is stored, and can use the profile, as well as the magnitude of current applied to the valve and the state of a position switch associated with the valve. In one example, this enables the system to perform, control, or prevent actions to the valve based on the analysis.

At step 640, the system determines whether the state of the valve needs to be changed. This could be, for example, based on the analysis module making a determination based on data from the first and the second redundant, valve control systems. If no change is needed to the state of the valve, then the process repeats at step 640. When an action needs to be performed with respect to the valve (e.g., opening, closing or maintaining a state), the system performs the action at step 650. This could include, for example, opening the valve, closing the valve, changing an intermediate state of the valve, maintaining the current state of the valve, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device for determining the position of a valve comprising:
   a driver having a mechanical connection to the valve and configured to change a position of the valve;
   a controller electrically connected to the driver and configured to electrically cause the driver to change the position of the valve;
   a current sensor electrically connected to the driver configured to detect a magnitude of current associated with the driver;
   a position switch associated with the valve configured to detect a state of the valve;
   a current profile including at least the magnitude of current, wherein the current profile includes at least a first data field associated with the magnitude of the current and a second data field associated with the state of the valve, using the current profile to potentially alter a state of the driver; and
   an analysis module for using the current profile and the state of the valve to perform at least one action, wherein the at least one action includes generating the current profile associated with the valve.

2. The device of claim 1 wherein the at least one action includes the analysis module storing data in a memory.

3. The device of claim 1, wherein the analysis module is configured to obtain a waveform associated with the magnitude of current provided to the driver.

4. The device of claim 1, wherein the controller is configured to provide power via one or more lines to the driver.

5. The device of claim 1, further comprises:
   a waveform module configured to generate data including current values derived from opening or closing the valve relates to a waveform associated with the magnitude of current provided to the driver; and
   a detection module configured to determine valve activity that provides control of the valve with current control via one or more lines to the driver using the waveform module.

6. The device of claim 1 wherein altering the state of the driver includes moving the driver such that the valve closes or moves to an intermediate state between an open position and a closed position.

7. The device of claim 1 wherein altering the state of the driver includes moving the driver such that the valve opens or moves to an intermediate state between an open position and a closed position.

8. A method for determining a position of a valve comprising:
   changing a position of a valve using a driver having a mechanical connection to the valve;
   detecting a magnitude of a current associated with the driver using a current sensor electrically connected to the driver;
   detecting a state of the valve using a position switch associated with the valve;
   generating a profile associated with the valve, wherein the profile includes at least a first data field associated with the magnitude of the current and a second data field associated with the state of the valve, and wherein using the profile to potentially alter a state of the driver; and performing at least one action with an analysis module that uses at least the magnitude of the current and the state of the valve.

9. The method of claim 8 wherein the at least one action includes storing data in a memory with the analysis module.

10. The method of claim 8 wherein altering the state of the driver includes moving the driver such that the valve closes, opens, or moves to an intermediate position.

11. The method of claim 8, further comprising obtaining a waveform of the magnitude of current associated with the driver.

12. The method of claim 8, further comprising providing power via one or more lines to the driver .

13. The method of claim 8, further comprising:
   generating data using a waveform module, the data includes current values derived from opening or closing the valve relates to a waveform associated with the magnitude of current provided to the driver; and
   determining valve activity using a detection module, the valve activity provides control of the valve with current control via one or more lines to the driver using the waveform module.

14. A device for determining the position of a valve comprising:
   a driver having a mechanical connection to the valve and configured to change a position of the valve;

a controller electrically connected to the driver and configured to electrically cause the driver to change the position of the valve;

a current sensor electrically connected to the driver configured to detect a magnitude of current associated with the driver;

a position switch associated with the valve configured to detect a state of the valve;

a current profile including at least the magnitude of current; and an analysis module for using the current profile and the state of the valve to perform at least one action, wherein the at least one action includes generating the current profile associated with the valve, wherein the current profile includes at least a first data field associated with the magnitude of the current and a second data field associated with the state of the valve; and using the current profile to potentially alter a state of the driver.

15. The device of claim 14, wherein the analysis module is configured to obtain a waveform of the magnitude of current associated with the driver.

16. The device of claim 14, further comprises:

a waveform module configured to generate data including current values derived from opening or closing the valve relates to a waveform associated with the magnitude of current provided to the driver; and a detection module configured to determine valve activity that provides control of the valve with current control via one or more lines to the driver using the waveform module.

17. A method for determining a position of a valve comprising:

changing a position of a valve using a driver having a mechanical connection to the valve;

detecting a magnitude of a current associated with the driver using a current sensor electrically connected to the driver;

detecting a state of the valve using a position switch associated with the valve; and performing at least one action with an analysis module that uses at least the magnitude of the current and the state of the valve, wherein the at least one action includes generating a profile associated with the valve, and wherein the profile includes at least a first data field associated with the magnitude of the current and a second data field associated with the state of the valve, using the profile to potentially alter a state of the driver.

18. The method of claim 17, further comprising obtaining a waveform of the magnitude of current associated with the driver.

19. The method of claim 17, further comprising:

generating data using a waveform module, the data includes current values derived from opening or closing the valve relates to a waveform associated with the magnitude of current provided to the driver; and determining valve activity using a detection module, the valve activity provides control of the valve with current control via one or more lines to the driver using the waveform module.

\* \* \* \* \*